United States Patent
Lautenschlaeger et al.

(10) Patent No.: US 7,628,037 B2
(45) Date of Patent: Dec. 8, 2009

(54) METHOD FOR PREVENTING BUBBLES ON PRECIOUS METAL COMPONENTS

(75) Inventors: Gerhard Lautenschlaeger, Jena (DE); Thomas Pfeiffer, Ingelheim (DE); Andreas Roters, Mainz (DE); Gernot Roeth, Dalheim (DE)

(73) Assignee: Schott AG, Mainz (DE)

( * ) Notice: Subject to any disclaimer, the term of this patent is extended or adjusted under 35 U.S.C. 154(b) by 554 days.

(21) Appl. No.: 11/091,599

(22) Filed: Mar. 28, 2005

(65) Prior Publication Data

US 2005/0217317 A1  Oct. 6, 2005

(30) Foreign Application Priority Data

Mar. 30, 2004  (DE)  .................. 10 2004 015 577

(51) Int. Cl.
   *C03B 5/167*  (2006.01)
(52) U.S. Cl. ............. 65/29.12; 65/134.9; 65/29.15; 65/29.18; 65/29.21
(58) Field of Classification Search .......... 65/134.9, 65/29.12, 29.15, 29.18, 29.21, 32.5
See application file for complete search history.

(56) References Cited

U.S. PATENT DOCUMENTS

| | | | | |
|---|---|---|---|---|
| 3,871,853 A | * | 3/1975 | Dietz et al. ............... | 65/32.5 |
| 4,983,198 A | * | 1/1991 | Ogino ..................... | 65/32.5 |
| 5,480,523 A | * | 1/1996 | Cocker et al. ............ | 205/783.5 |
| 5,580,439 A | * | 12/1996 | Baucke et al. ............ | 205/782 |
| 5,785,726 A | | 7/1998 | Dorfeld et al. | |
| 6,629,437 B1 | * | 10/2003 | Baucke et al. ............ | 65/134.9 |
| 6,993,936 B2 | * | 2/2006 | Grzesik et al. ........... | 65/134.9 |
| 7,007,515 B2 | * | 3/2006 | Dick et al. ................ | 65/346 |
| 2002/0026811 A1 | * | 3/2002 | Hoyer et al. .............. | 65/29.12 |
| 2003/0196453 A1 | * | 10/2003 | Roth et al. ................ | 65/29.12 |

FOREIGN PATENT DOCUMENTS

| | | |
|---|---|---|
| DE | 43 24 922 A1 | 2/1995 |
| EP | 1 101 740 A1 | 5/2001 |

OTHER PUBLICATIONS

Baucke: "Electrochemistry of Glasses and Glass Melts, Including Glass Electrodes", Springer Verlag Berlin, Heidelberg, New York, 2000, pp. 384-391. (In English).

* cited by examiner

*Primary Examiner*—John Hoffmann
(74) *Attorney, Agent, or Firm*—Michael J. Striker

(57) ABSTRACT

In the case of a method for manufacturing glass, with which molten glass is enclosed at least partially by precious metal walls or refractory metal walls, and with which the oxygen partial pressure of the molten glass is influenced by a treatment means to prevent disturbances, gas bubbles or other disturbances often form as a result of over-compensation. This over-compensation can be prevented by locating at least one probe (20) for determining the oxygen partial pressure at the interface—or close to the interface—of the glass melt and metal wall, and by regulating the influencing of the oxygen partial pressure in a safe range of the oxygen partial pressure with the treatment means using a regulating system (39, 45).

13 Claims, 4 Drawing Sheets

METHOD FOR PREVENTING BUBBLES ON PRECIOUS METAL COMPONENTS

FIELD OF THE INVENTION

The present invention relates to a method for manufacturing glass, with which molten glass is enclosed at least partially by precious metal walls and/or refractory metal walls, and with which the oxygen partial pressure of the molten glass is influenced by a treatment means to prevent disturbances, a device for this purpose, and the use of the glass obtained as a result.

BACKGROUND OF THE INVENTION

In this context, the term "precious metal" includes platinum, gold, rhenium, all other metals in the platinum group, and the alloys of the aforementioned metals, and the stated metals and alloys in oxide dispersion-strengthened form. Molybdenum is used in particular as the refractory metal, as are tungsten, niobium and tantalum.

It is known that, at high temperatures such as those that occur in a glass melt, for example, a small portion of the water that is present breaks down into hydrogen and oxygen. When the glass melt comes in contact with components made of precious metals, in particular platinum and its alloys, the hydrogen that is formed can pass through the platinum part. As a result, the oxygen in the melt is enriched and oxygen bubbles form that—provided no further action is carried out—remain in the finished glass product and lower its quality in a critical manner. Particularly problematic in this regard is the fact that precious metal components are used primarily directly after the refining area, making it very difficult to remove the oxygen bubbles that form on the precious metal components from the glass melt.

Publication EP 1 101 740 A1 therefore proposes that bubbles be prevented from forming by applying a reverse voltage via electrochemical means. A variant is proposed, among others, with which the one molybdenum electrode is located in the glass melt upstream of the precious metal components, the electrode being connected in a conductive manner with the precious metal components. An adequate reverse voltage is generated as a result without an external power supply. A method is described in publication U.S. Pat. No. 5,785,726, with which oxygen bubbles are prevented from forming in the glass melt by preventing hydrogen from the glass melt from escaping through the precious metal walls by establishing an atmosphere on the side of the precious metal walls facing away from the glass melt that contains a high percentage of water vapour. The purpose of this is to prevent hydrogen gas from the glass melt from diffusing to the outside through the precious metal walls made permeable by the high temperatures. With the two known methods, oxygen bubbles can indeed be largely prevented from forming in the glass melt on precious metal components, but, as a result, the oxygen partial pressure is held at the level that existed before the melt flowed into the platinum system.

It has been shown that bubbles still form with the known procedures described above, however, and defective glasses are produced as a result.

The problem addressed by the present invention is to provide a method and a device for producing glass, with which the formation of bubbles on precious metal components—and other disturbances—can be reliably prevented.

SUMMARY OF THE INVENTION

The problem is solved, with the method of the type described initially, by determining the particular oxygen partial pressure on a precious metal part using a voltages between the precious metal part and a reference electrode located in the melt and calaulating it from the voltage. The precious metal part, particular the walls of the tank and/or the pipe, is preferably subdivided into segments that are electrically insulated from each other. Insulation of this type is composed, for example, of parts of fire-resistant material such as mullite, sillimanite, quartzal and/or corundum. This makes it possible to regulate the oxygen partial pressure in the safe range in an individualized manner for each individual insulated precious metal part via separate regulation of the treatment means.

According to the present invention, it was discovered that, with the known method described above for suppressing the formation of oxygen bubbles, the oxygen partial pressure in the melt in the region of contact with the precious metal components is reduced to the extent that at least partially reducing conditions exist. It has been shown according to the present invention that, surprisingly, at an oxygen partial pressure that is too low, $N_2$, $CO_2$ and $SO_2$ bubbles start to form and/or alloy damage occurs. The present invention is therefore based on the finding that extreme reducing conditions must be prevented to ensure good glass quality. According to the present invention, these extreme reducing conditions are prevented by adjusting and/or regulating the oxygen partial pressure that exists at the interface of the glass melt and the precious metal part in particular within a safe range. This can take place at the interface itself, for example, or by using an electrode located in the melt. The electrode is preferably located in the region close to the interface. The oxygen partial pressure can be raised or lowered by applying a reverse voltage with the appropriate polarity. In addition, the oxygen content can be lowered by using a reducing hydrogen or water vapour atmosphere, and it can be increased by rinsing with oxygen in pure or diluted form.

This safe range can be determined for the particular glass being used in a first method step, for example. In this step, the upper limiting value of the safe range is limited by the formation and/or prevention of $O_2$ bubbles, and the lower limiting value is limited by the formation and/or prevention of $N_2$, $CO_2$ and/or $SO_2$ bubbles and/or alloy damage. It was also discovered that various glasses have different safe ranges. The determination of the particular safe ranges takes place in laboratory tests carried out in advance, for example. Surprisingly, it has also been shown that even the same glasses can have deviating safe ranges depending on the raw materials used and, in particular, on the water content of the melt. In addition, the water content of the atmosphere above and around the melt also has a strong influence on the oxygen partial pressure in the melt.

A further development of the method according to the present invention is characterized by the fact that a lower threshold value of the oxygen partial pressure of the safe range is above $10^{-7}$ bar, preferably $10^{-4}$ bar, and, in particular, above $10^{-3}$ bar. Depending on the particular glass that is used, it has been shown that, with certain glasses, disturbances do not occur until the pressure drops below $10^{-7}$ bar. With other glasses, a disturbance does not occur until the pressure falls below $10^{-4}$ bar. Above $10^{-3}$ bar, formation of $N_2$, $CO_2$ and $SO_2$ bubbles, and the occurrence of alloy damage is ruled out in nearly every case.

With another further development, an upper threshold value of the oxygen partial pressure of the safe range is 0.4 bar. When the pressure falls below 0.4 bar and pressure is being regulated in a safe range, disturbance caused by the formation of oxygen bubbles on precious metal components is reliably prevented in most cases. By way of this regulation in the safe range, it is not necessary to increase a reverse voltage for a period long enough to prevent bubbles from forming, for example. Rather, this regulation makes it possible to adjust to conditions in the safe range in advance, so that defect-free production is ensured.

The basis of the present invention is to measure the oxygen partial pressure, for which an electrode pair composed of a reference electrode and a measuring electrode is used as the probe. In particular, a zircon oxide reference electrode or a molybdenum reference electrode may be used as the reference electrode. A platinum measuring electrode can be used as the measuring electrode. It is also possible to use the precious metal walls themselves as the measuring electrode, however.

It has proven advantageous to use the oxygen partial pressure in the melt as the setpoint value for the regulation and, in fact, in its state when it leaves the melting area and, in particular, before the oxygen partial pressure has changed due to contact with a precious metal wall. The oxygen partial pressure of the setpoint value is measured in the melt at a precious metal electrode in particular, whereas the actual value is the oxygen partial pressure at the respective precious metal wall. The same reference electrode can then be used, preferably, to determine the setpoint value and the actual value. The oxygen partial pressure in the unchanged melt is compared with the oxygen partial pressure at the interface with the precious metal wall in the manner described. Good results are obtained as a result. It can also be necessary, however, to select another setpoint value based on the known safe range.

With the procedure according to the present invention, the oxygen partial pressure is determined using the electromotive force, EMF, between the measuring electrode and the reference electrode of the electrode pair. The electromotive force, EMF, is linked with oxygen partial pressure in a known manner, via the Nernst equation, by way of which the oxygen partial pressure can be easily determined. A reference electrode for performing an electrochemical determination of the oxygen partial pressure is known from DE 43 24 922 A1, in particular. In general, when a "$ZrO_2$ reference electrode" composed of yttrium-stabilized zircon oxide is used, the oxygen partial pressure $PO_2$ (2) of the melt can be determined from the electromotive force, EMF, of the isothermal electrochemical measuring chain Pt, $O_2$ (1)/Zr $O_2$+x $Y_2O_3$/melt, $O_2$ (2)/Pt as follows:

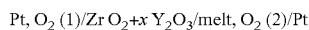

$$pO_2(2)=pO_2(1)*e^{-E4F/(RT)}$$

whereby F is the Faraday constant

R is the gas constant

T is the temperature in the glass melt in °K.

With non-isothermal melts, the temperatures of measuring and reference electrodes must be measured separately. To calculate the oxygen partial pressure, an expanded formula is therefore necessary:

$$PO_{2\,(S)}=\exp((4*F/R*T_{(S)})*(E-(-0.0004739)*(T_{(S)}-T_{(R)}))+T_{(R)}/T_{(S)}*\ln pO_{2(R)})$$

The following apply:

$T_{(S)}$ is the temperature of the melt measured at the site of the platinum measuring electrode.

$T_{(R)}$ is the temperature at the site of the $ZrO_2$ reference electrode.

$PO_{2(R)}$ is the oxygen partial pressure of the rinse gas of the reference electrode.

−0.0004739 V/K is the Seebeck coefficient of melt and/or zircon oxide.

For more information, refer to Baucke, "Electrochemistry of Glasses and Glass Melts, Including Glass Electrodes", Springer Verlag Berlin Heidelberg New York 2000

A prerequisite for the use of the equation described is that a defined oxygen partial pressure $pO_2(1)$ exists at the three-phase limit Pt (1), $O_2$ (1) $ZrO_2$+x $Y_2O_3$.

To influence the oxygen partial pressure, a counter electrode can be located upstream in the glass melt. It can be located so far upstream, for example, that any gas bubbles that form on this counter electrode do not result in damage to the glass production. To influence the oxygen partial pressure, a reverse voltage can then be applied between the counter electrode and the precious metal wall. It is also possible to use a counter electrode composed of refractory metal, in particular molybdenum, however, and to connect it in a conductive manner with the precious metal wall. This molybdenum electrode can then discharge positively charged metal ions into the glass melt and thereby provide a suitable reverse voltage at the precious metal wall.

With another embodiment, to influence the oxygen partial pressure, mixtures of water vapour and air or water vapour and nitrogen with a specified portion of vapour or hydrogen gas at a specified partial pressure are directed at the side of the precious metal wall facing away from the glass melt. The former have the lowest reduction effect and the latter have the strongest reduction effect. Oxygen-nitrogen mixtures have an oxiding effect and can prevent drifting into the reducing region with subsequent formation of $N_2$, $CO_2$, $SO_2$ bubbles. For this purpose, the precious metal wall can be provided with a double-wall configuration, for example, so that the hydrogen gas or water vapour need be applied only to a cavity located between the double wall.

The device according to the present invention includes at least one precious metal wall or refractory metal wall that at least partially encloses the molten glass, and is characterized by a regulating system for regulating the oxygen partial pressure, in particular in the region near the interface of the melt and the tank wall.

In particular, the device includes a first electrode pair for determining the oxygen partial pressure in the glass melt as a setpoint value and a second electrode pair for determining the oxygen partial pressure as an actual value for the regulation, whereby the precious metal wall is preferably the measuring electrode of the electrode pair. It is also possible, in principle, to locate the measuring electrode in a region close to the wall such that it is insulated from the wall. Preferably, all electrode pairs should have a common reference electrode; less outlay is required and the accuracy of the measurement is increased as a result.

The glass obtained with the method or the device having the features of the present invention is suited in particular for the production of LCDs, TFTs, monitors, television screens, optical lenses, cooking utensils, microwave utensils, electronic devices, cook tops, window glasses, lamp glasses and display glasses.

DETAILED DESCRIPTION OF THE PREFERRED EMBODIMENTS

Figure 1:
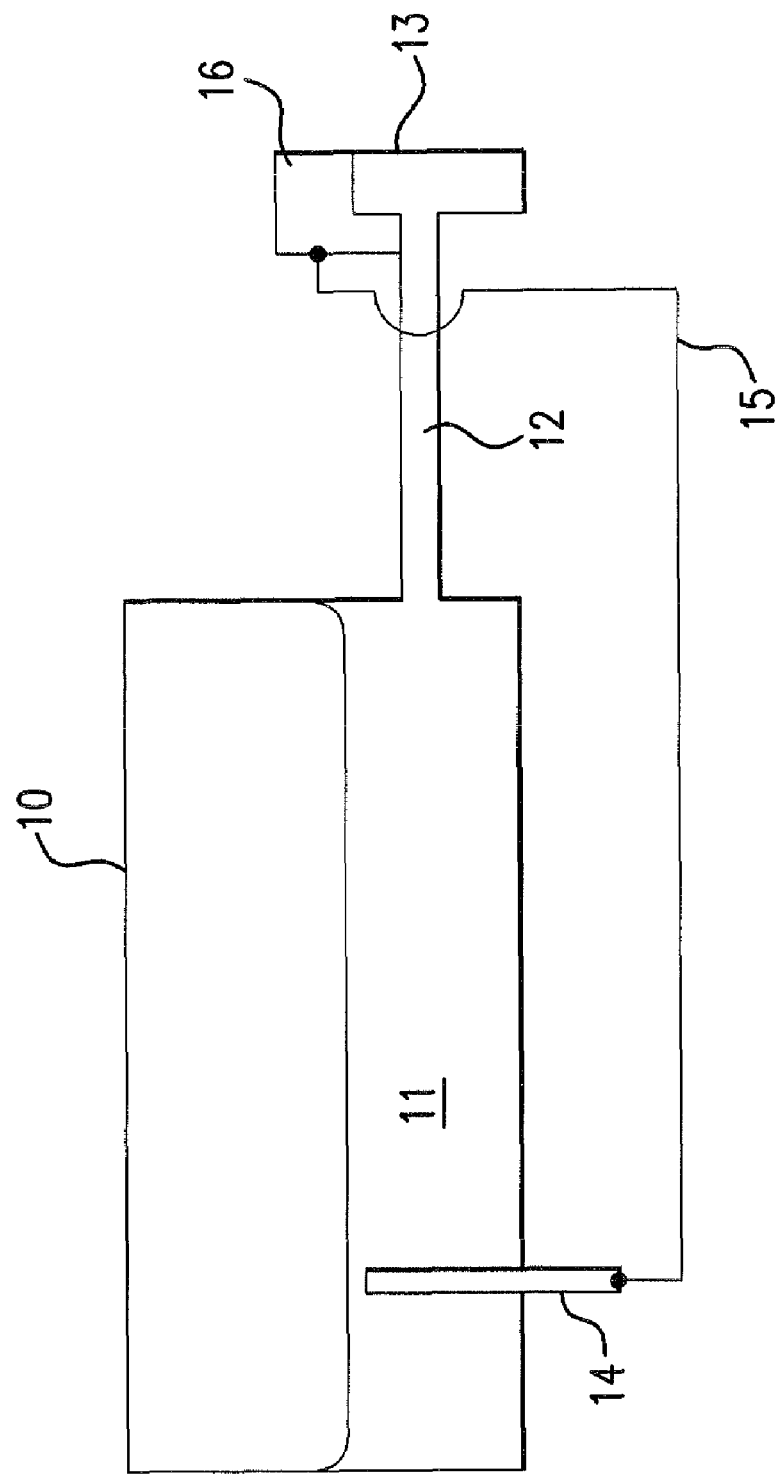
FIG. 1 shows a schematic representation of a device with the features according to the present invention.

FIG. 1 shows a device having the features of the present invention, as a first exemplary embodiment. The figure shows a melting area 10 with glass melt 11 located therein. Melting area 10 is shown as a schematic illustration only. In particular, various areas for melting and refining are not shown in the figure. Melting area 10 is connected with a stirring crucible 13 via a feeder channel 12. In the exemplary embodiment shown, feeder channel 12 and stirring crucible 13 are composed of platinum or a platinum alloy. In addition, a counter electrode 14 is located in the melting area 10 in the region of the glass melt 11, the counter electrode being connected with a control system 16 by a line 15. Counter electrode 14 can also be located at another point. It is important that counter electrode 14 be located upstream of stirring crucible 13 and, in particular, upstream of a refining area.

Figure 2:
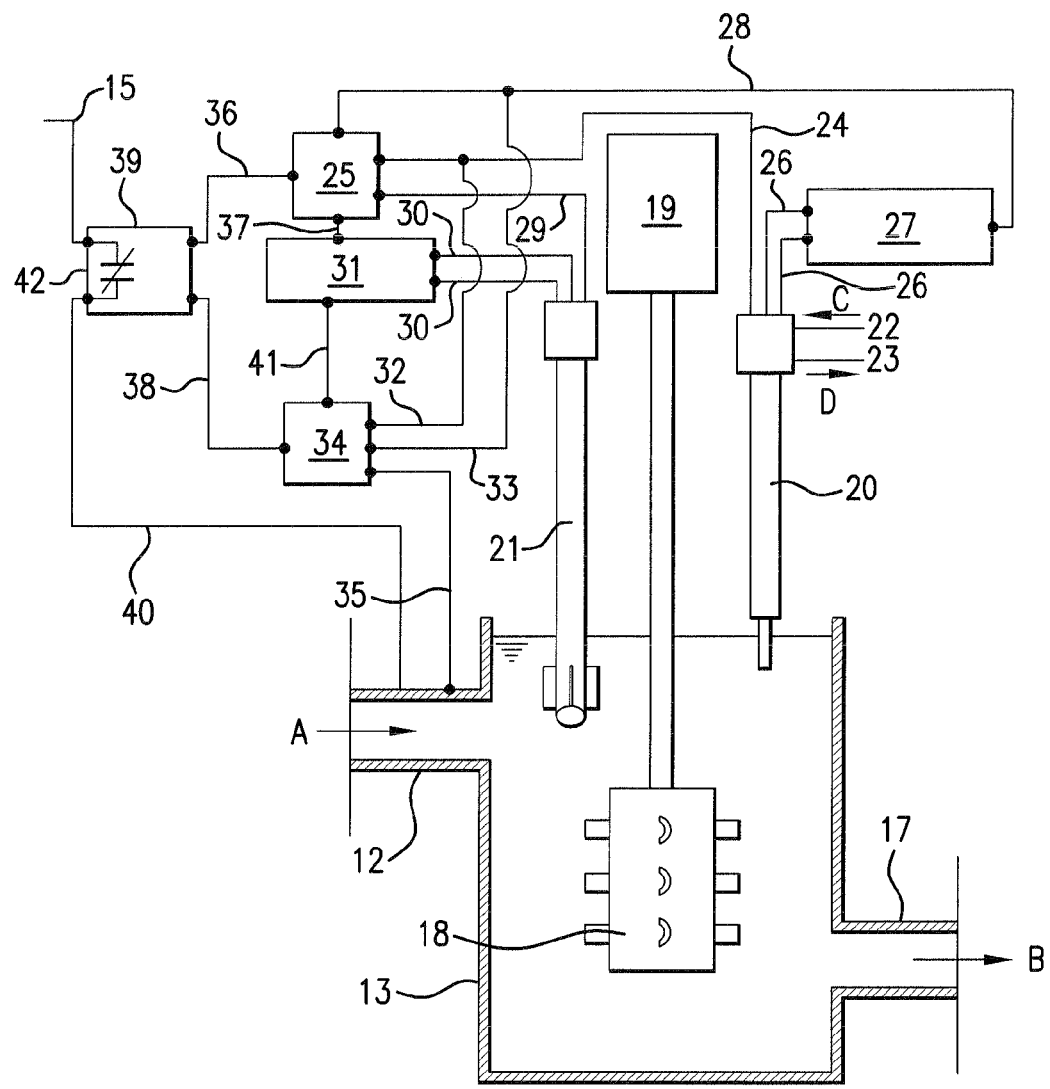
FIG. 2 shows a stirring crucible with a regulating system from FIG. 1 for adjusting the oxygen partial pressure using reverse voltage.

FIG. 2 shows a schematic illustration of stirring crucible 13 and control system 16 in FIG. 1. As shown in the figure, molten glass is forwarded to stirring crucible 13 from feeder channel 12, as indicated by arrow A. An outlet 17 is located on the side of stirring crucible 13 opposite feeder channel 12, through which said outlet glass is forwarded for further production, as indicated by arrow B. In addition, a stirring mechanism 18 with a drive 19 is located in stirring crucible 13. In the exemplary embodiment shown, stirring mechanism 18 is composed of platinum.

In addition, a reference electrode 20 and a measuring electrode 21 are located in the region of stirring crucible 13, the electrodes being immersed in the glass melt located in stirring crucible 13. In the exemplary embodiment shown, reference electrode 20 is a zircon oxide reference electrode. A molybdenum rod can also be used as the reference electrode, if it is ensured that the molybdenum rod does not alloy on the surface in the melt, and that it is not alloyed. Reference electrode 20 includes a supply line 22 and a discharge line 23. Supply line 22 and discharge line 23 serve to supply and carry away, respectively, gas with a defined oxygen partial pressure, as indicated by arrows C and D. Reference electrode 20 is connected via a line 24 with a first evaluation unit 25. Reference electrode 20 is also connected via two lines 26 with a temperature measuring device 27. In the exemplary embodiment shown, reference electrode 20 includes a thermoelement, the two ends of which are connected via lines 26 with temperature measuring device 27, which is a thermoelement measuring device 27 in this case. Thermoelement measuring device 27 is also connected via a line 28 with first evaluation unit 25.

Electrode 21 is also connected via a line 29 with first evaluation unit 25. In addition, electrode 21 also includes a thermoelement, which is connected via lines 30 with a temperature measuring device 31 similar to temperature measuring device 27. The temperature of measuring electrode 21 measured by temperature measuring device 31 is forwarded to measuring device 25 via line 37.

Lines 24 and 28 are connected via lines 32 and 33 with a second evaluation unit 34 similar to first evaluation unit 25. A third input to second evaluation unit 34 is connected via a line 35 with feeder channel 12 in the region of the transition of feeder channel 12 to stirring crucible 13. The outputs of first evaluation unit 25 and second evaluation unit 34 are connected via lines 36, 38 with the inputs of a regulating unit 39. The regulating unit 39 is also connected via a line 40 with feeder channel 12 in the region of the transition to stirring crucible 13. In addition, regulating unit 39 is connected via line 15 with counter electrode 14.

The electromotive force, EMF, between reference electrode 20 and electrode 21 is determined using first evaluation unit 25 and, based also on the temperatures determined by thermoelement measuring devices 27 and 31, is converted to an oxygen partial pressure. This oxygen partial pressure is forwarded via line 36 to regulating unit 39 as the setpoint value for the regulation. Second evaluation unit 34 determines the electromotive force between reference electrode 20 and the wall of stirring crucible 13 and/or feeder channel 12 in the region of stirring crucible 13 and converts it, based on the temperature determined by thermoelement measuring device 31, to an oxygen partial pressure, which is forwarded to the regulating unit 39 via line 38 as the actual value for the regulation. Regulating unit 39 compares the actual value of the oxygen partial pressure transferred from evaluation unit 34 with the setpoint value for the oxygen partial pressure transferred from evaluation unit 25 and regulates a reverse voltage between counter electrode 14 and feeder channel 12 in the region of the transition to stirring crucible 13. The oxygen partial pressure in the region of the wall of stirring crucible 13 and feeder channel 12 in the region of the wall of stirring crucible 13 can be adjusted to a desired range in the manner described by reliably preventing disturbances to the glass that exits at B.

Figure 3:
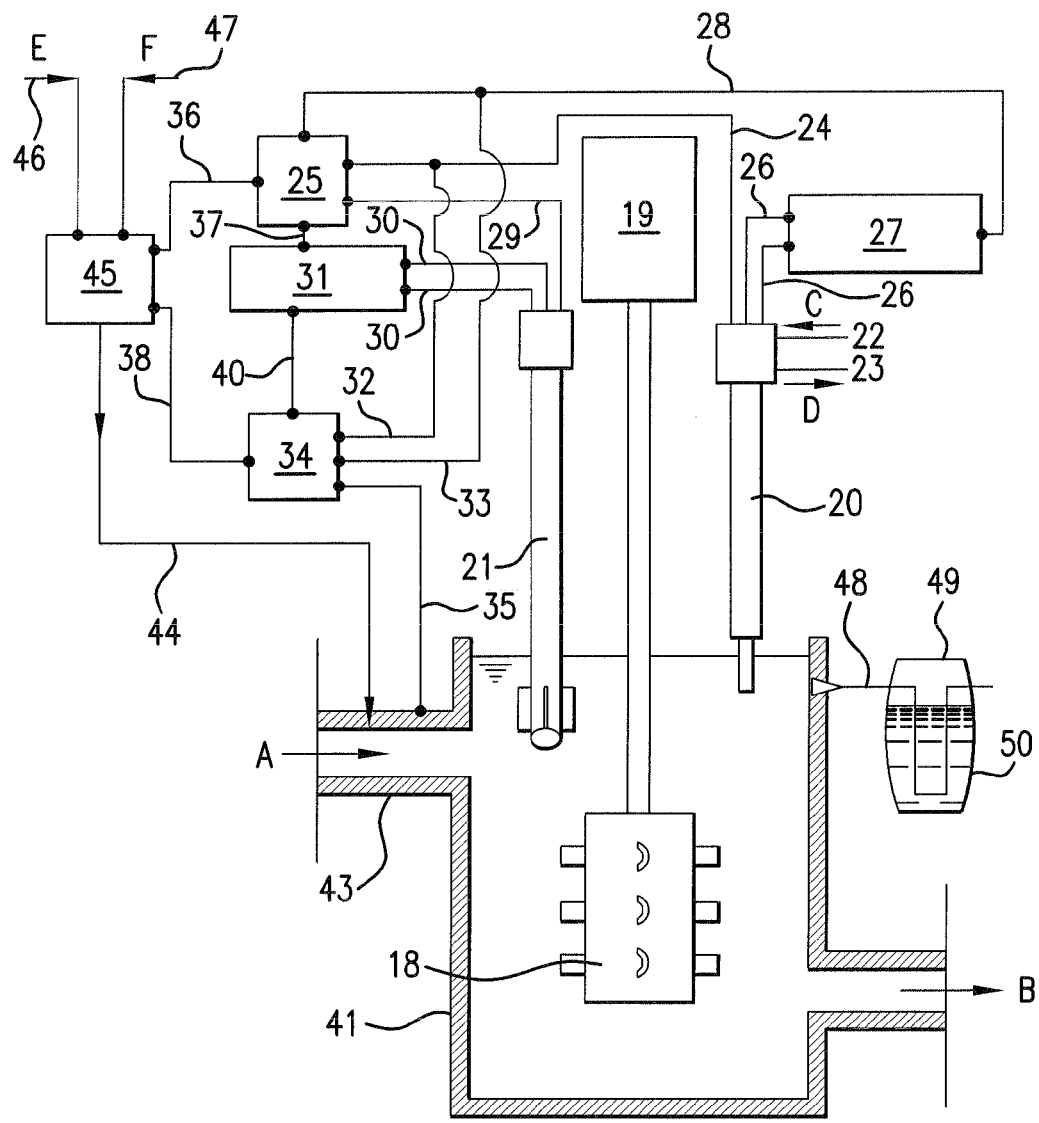
FIG. 3 shows a stirring crucible with regulation of the oxygen partial pressure using vapour or gas rinsing.

FIG. 3 shows a schematic illustration of a further exemplary embodiment of a stirring crucible 41 and a control system having the features of the present invention. Identical elements are labelled with the same reference numerals. Stirring crucible 41 is connected with melting area via a feeder channel 43 similar to feeder channel 12. In contrast to stirring crucible 13 and feeder channel 12, stirring crucible 41 and feeder channel 43 have a double-wall configuration, so that gas can be directed through between the walls. An inlet in the region of feeder channel 43 is connected with a regulating unit 45 using a gas line 44. Similar to regulating unit 39, regulating unit 45 is connected with first evaluation unit 25 and second evaluation unit 34. Furthermore, regulating unit 45 includes an inlet for a gas line 46 and a further inlet for a gas line 47. Gas line 46 serves to supply a carrier gas such as nitrogen, as indicated by arrow E. Gas line 47 serves to supply a reactive gas, as indicated by arrow F. Water vapour and/or a hydrogen/nitrogen mixture can be used as the reactive gas.

An outlet of stirring crucible 41 is connected via a gas line 48 with a washing bottle 49, the outlet 50 of which leads to a waste gas purification system or an exhaust air line.

Similar to the exemplary embodiment in FIG. 2, regulating unit 45 performs regulation by comparing the actual value of the oxygen partial pressure at feeder channel 43 obtained from line 38 with the setpoint value of the oxygen partial pressure at electrode 21 obtained via line 36.

The mixing ratio of reactive gas F with carrier gas E is adjusted as a function of this setpoint/actual value comparison. The gas mixture obtained as a result is directed into the double wall of stirring crucible 41 and/or feeder channel 43. By adjusting a suitable hydrogen or water vapour partial pressure in the double wall of stirring crucible 41 and/or feeder channel 43, equilibrium is established between the diffusion of hydrogen from the glass melt through the wall of stirring crucible 41 and hydrogen from the double wall back through the wall and into the glass melt, so that a desired oxygen partial pressure at the interface of the metal and glass melt can be obtained. The gas then passes through gas line 48 and into washing bottle 49, and can then be carried away via outlet 50.

Figure 4:
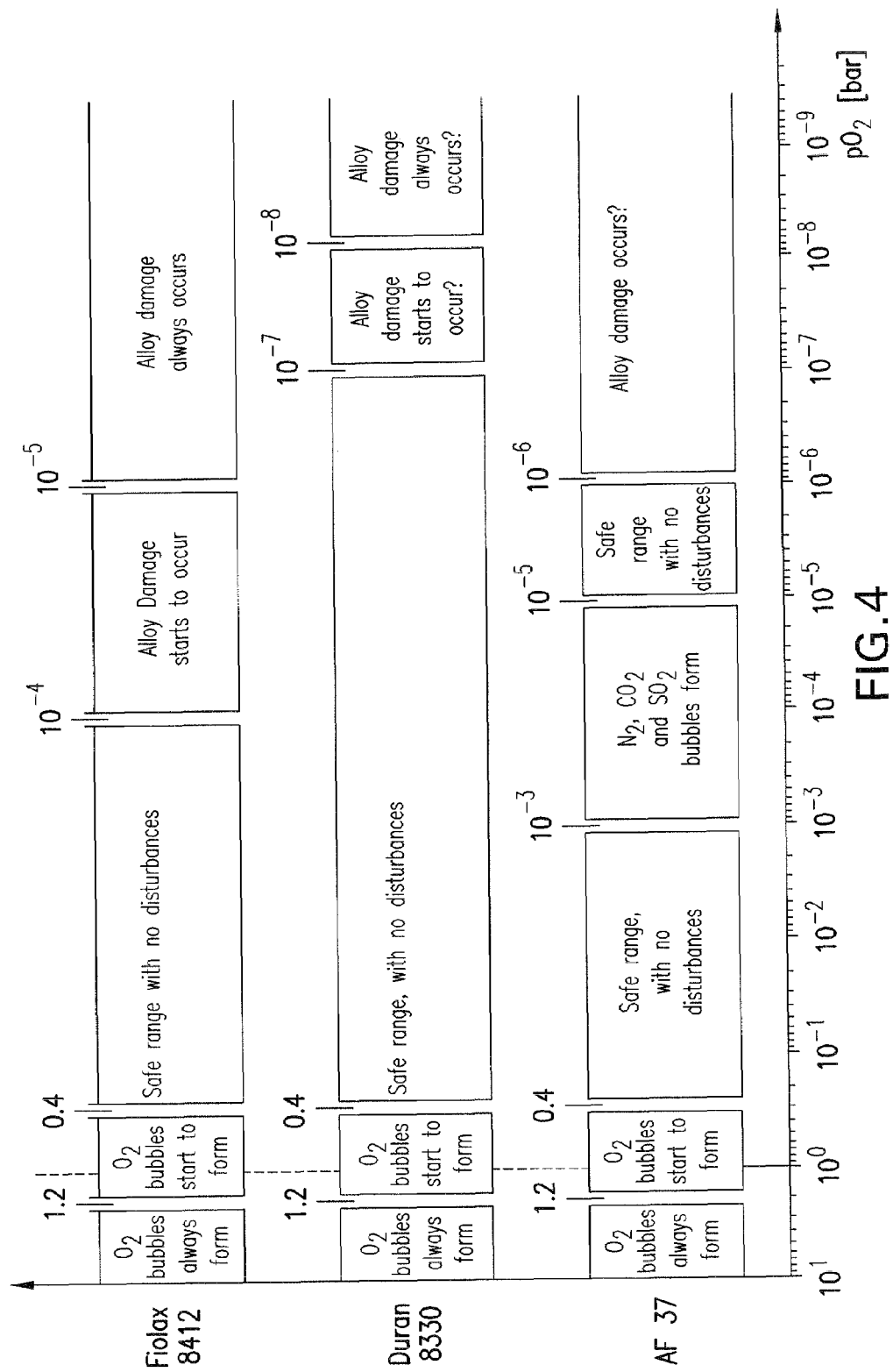
FIG. 4 shows a diagram of safe ranges for various types of glass.

FIG. 4 shows a diagram that indicates safe ranges for various types of glass for various oxygen partial pressures in the glass melt. For example, a safe range for a glass AF 37 extends from $10^{-3}$ to 0.4 bar. Above 0.4 bar, $O_2$ bubbles start to form. Below $10^{-3}$ bar, $N_2$, $CO_2$ and $SO_2$ bubbles start to form. In an oxygen partial pressure range between $10^{-6}$ and $10^{-5}$, no $O_2$, $N_2$, $CO_2$ or $SO_2$ bubbles form. Alloy damage can occur at oxygen partial pressures below $10^{-6}$ bar.

For Duran 8330 glass (from Schott Glas, Mainz, Germany), a safe range without disturbances from $10^{-7}$ to 0.4 bar was determined for oxygen partial pressures. At oxygen partial pressures above 0.4 bar, $O_2$ bubbles can be expected to form, as is the case with AF37 glass (Schoft Glas). When oxygen partial pressures are below $10^{-7}$ bar, there is a risk that alloy damage will occur.

The third glass shown in the diagram is Fiolax 8412 (Schott Glas). A safe range for oxygen partial pressure from $10^{-4}$ to 0.4 bar was determined for this glass. In this case, $O_2$ bubbles can be expected to form at oxygen partial pressures above 0.4 bar. And, at oxygen partial pressures below $10^{-4}$ bar, there is a risk of alloy damage.

According to the present invention, damage and disturbance to the glass that is produced are prevented by determining a safe range, depending on the type of glass used, and regulating to oxygen partial pressures in the particular safe range using control systems 16, 42 and, in particular, regulating units 39, 45.

The invention claimed is:

1. A method of manufacturing glass, said method comprising the steps of:
   a) at least partially enclosing a glass melt from which the glass is manufactured with at least one precious metal or refractory metal wall;
   b) measuring an oxygen partial pressure at an interface between said glass melt and said at least one precious metal or refractory metal wall;
   c) measuring an oxygen partial pressure in the glass melt at a precious metal electrode immersed in the glass melt;
   d) using the oxygen partial pressure measured in step c at said precious metal electrode immersed in said glass melt as a set point value and the oxygen partial pressure measured in step b at said interface as an actual value; and
   e) adjusting or influencing said oxygen partial pressure at said interface between said glass melt and said at least one precious metal or refractory metal wall according to a comparison between said actual value and said set point value, so that said oxygen partial pressure at said interface is within a safe range;
   wherein said safe range has an upper threshold value, above which oxygen bubbles form at said interface, and a lower threshold value, below which alloy damage or formation of bubbles of $N_2$, $CO_2$ or $SO_2$ occurs at said at least one precious metal or refractory metal wall.

2. The method as recited in claim 1, wherein said lower threshold value of the safe range for the oxygen partial pressure is above $10^{-7}$ bar.

3. The method as recited in claim 2, wherein said lower threshold value is above $10^{-4}$ bar.

4. The method as recited in claim 2, wherein said lower threshold value is above $10^{-3}$ bar.

5. The method as recited in claim 1, wherein said upper threshold value of the safe range for the oxygen partial pressure range is 0.4 bar.

6. The method as recited in claim 1, wherein said oxygen partial pressure at said interface is measured with a probe and said probe includes a reference electrode and a measuring electrode.

7. The method as recited in claim 6, wherein said reference electrode is a zircon oxide reference electrode or a molybdenum reference electrode.

8. The method as recited in claim 6, wherein said measuring electrode is a platinum electrode located in the glass melt in a region close to said interface or comprises said at least one precious metal or refractory metal wall.

9. The method as recited in claim 6, wherein the oxygen partial pressure is determined via an electromotive force measured between the measuring electrode and the reference electrode.

10. The method as recited in claim 1, wherein a common reference electrode is used in a determination of the set point value and the actual value.

11. The method as recited in claim 1, wherein said adjusting or influencing said oxygen partial pressure comprises supplying hydrogen gas, water vapor, or a mixture of hydrogen gas and water vapor to a side of said at least one precious metal or refractory metal wall facing away from said glass melt as a function of said comparison between said set point value and said actual value.

12. The method as recited in claim 1, wherein said adjusting or influencing said oxygen partial pressure at said interface comprises arranging a counter electrode in the glass melt in a melting area upstream of the at least one precious metal or refractory metal wall and regulating a voltage between the counter electrode and the at least one precious metal or refractory metal wall according to said comparison between said set point value and said actual value.

13. The method as recited in claim 12, wherein said counter electrode comprises molybdenum.

* * * * *